(12) United States Patent
Harris

(10) Patent No.: US 10,921,689 B2
(45) Date of Patent: Feb. 16, 2021

(54) ENHANCED CAMERA POSITIONER

(71) Applicant: Thomas H. S. Harris, Brooklyn, NY (US)

(72) Inventor: Thomas H. S. Harris, Brooklyn, NY (US)

(*) Notice: Subject to any disclaimer, the term of this patent is extended or adjusted under 35 U.S.C. 154(b) by 0 days.

(21) Appl. No.: 15/804,388

(22) Filed: Nov. 6, 2017

(65) Prior Publication Data
US 2018/0292734 A1 Oct. 11, 2018

Related U.S. Application Data

(63) Continuation of application No. 13/908,967, filed on Jun. 3, 2013, now abandoned.

(51) Int. Cl.
| | |
|---|---|
| *G03B 17/56* | (2006.01) |
| *F16M 13/00* | (2006.01) |
| *F16M 11/10* | (2006.01) |
| *F16M 11/20* | (2006.01) |
| *F16M 11/18* | (2006.01) |

(52) U.S. Cl.
CPC .......... *G03B 17/561* (2013.01); *F16M 11/10* (2013.01); *F16M 11/18* (2013.01); *F16M 11/2014* (2013.01); *F16M 13/00* (2013.01)

(58) Field of Classification Search
CPC .... F16M 11/10; F16M 11/18; F16M 11/2014; F16M 13/00; G03B 17/561
USPC ........................................................ 396/420
See application file for complete search history.

(56) References Cited

U.S. PATENT DOCUMENTS

| | | | | |
|---|---|---|---|---|
| 5,243,370 A | * | 9/1993 | Slater | F16M 13/04 248/123.2 |
| 5,963,749 A | * | 10/1999 | Nicholson | F16M 11/105 396/421 |
| 6,808,324 B2 | * | 10/2004 | McKay | G03B 17/02 396/421 |
| 8,506,180 B2 | * | 8/2013 | Brown | F16M 13/04 248/187.1 |
| 9,534,730 B2 | * | 1/2017 | Black | F16M 11/10 |
| 2010/0079101 A1 | * | 4/2010 | Sidman | F16M 11/041 318/649 |

* cited by examiner

*Primary Examiner* — Rodney E Fuller
(74) *Attorney, Agent, or Firm* — Shutts & Bowen LLP

(57) ABSTRACT

Various operator supported camera positioning systems are disclosed. The camera positioning systems can allow translational and rotational movement of different camera types on a camera mount. An operator interface, such as a handle bar or elongated beam, can operatively support the camera mount through a series of rotational linkages, allowing for relative rotation of the camera mount about one, two or three axes. The rotation about some or all of these axes can be controlled by drives, and control signals for these drives can be generated by one or more inertial transducers to stabilize the surface mount and associated camera orientation and pointing by reducing deviations from the inertially fixed orientation of the camera mount in response to rotational movements of the system about the one or more controlled axes of rotation.

12 Claims, 15 Drawing Sheets

ENHANCED CAMERA POSITIONER

CROSS-REFERENCE TO RELATED APPLICATIONS

This application is a continuation of U.S. Non Provisional application Ser. No. 13/908,967, filed on Jun. 3, 2013, which claims the benefit of U.S. Provisional Application No. 61/657,815, filed Jun. 2, 2012, U.S. Provisional Application No. 61/732,394, filed Dec. 2, 2012, and U.S. Provisional Application No. 61/809,414, filed Apr. 7, 2013, which are all herein incorporated by reference.

FIELD

The subject matter of this application relates to camera support systems.

BACKGROUND

As discussed in U.S. Pat. Nos. 6,530,702, 6,923,542, 6,988,802, 6,994,436, and 7,128,419, which are incorporated by reference into this application, a camera positioning system that can be user supported and provide a stable platform for a range of motion beyond the user's reach can provide a number of advantages. The system can provide vertical camera functionality outside the user's normal height and reach through a substantial vertical range. The self-supported system can provide smooth support through complex motion in any orientation, that can include shots in a confined access environment, such as across a car interior through the open car windows.

Improvements in field adjustability for weight balancing, further weight reduction techniques and the ability to accommodate different camera types on a generic platform and to stabilize the platform would be advantageous in addressing current limitations in the field.

SUMMARY OF THE INVENTION

According to aspects of the invention, an operator supported camera positioning system can include a camera platform assembly having a camera mount for selectively mounting different camera types. The camera mount can be supported by one or two arms that are pivotally mounted to the camera mount for rotation about a first axis of rotation, for example, to allow tilt of the camera pointing. The camera platform assembly can be further supported by a camera platform assembly support pivotally connected to the camera platform assembly for rotation of the camera mount about a second axis of rotation, for example, to allow pan or roll of the camera pointing.

The system is held or otherwise borne by a single operator using hand grips, handles, or body supported vests, straps and the like. The operator interface structure provides at least one engagement surface for operator support and control of the system and connects to the platform assembly support. The operator interface structure can be constructed for example as a handle adjacent the camera platform assembly or as an elongated beam that enables the camera mount to be positioned a distance away from the operator at heights and spans out of arm's reach. The operator interface can also combine a modular handle bar near the camera platform assembly with an elongated beam extension that can be removably connected to the modular handle bar.

An inertial transducer is mounted on the system for sensing rotational motion of the transducer about one of the axes of rotation. The transducer generates a control signal responsive to the rotational motion, which controls a rotation drive connected to the camera platform assembly for controlling rotation of the camera mount about one of the axes. The rotation drive substantially reduces deviation from an inertially fixed orientation of the camera mount about the one axis.

The inertial transducer preferably has an adjustable gain that can be selectively set over a range of values from zero through some value greater than unity. The operator may set the gain to a value above unity and rotate the positioner through some angle containing a foreground photographic subject, causing the camera pointing to overcorrect beyond inertially fixed pointing and subsequently effect automatic "hands off" foreground tracking of some foreground object within the viewable scene of the camera.

The camera mount can rotate relative to the operator interface system about one, two or even three axes of rotation. Some or all of the axes of rotation can be drive-controlled and rotation about some or all of the axes can be stabilized by inertial transducers.

Another approach to camera mount stabilization can include the use of a pivotal reference post that is coupled to the camera mount to maintain a coordinated orientation. The reference post can be pivotally mounted to the operator interface and weighted to maintain a vertical orientation under gravity. Through a mechanical linkage or through electronic coordination, the vertical seeking post can auto-level the camera mount.

According to another aspect of the invention the camera platform assembly can be adjustable to re-balance for changes in weight and center of gravity when cameras or lenses are changed on the camera mount. The camera platform assembly can be constructed of tubular components that are adjustably connected. The adjustable connections can include close tolerance fits to avoid the weight and complexity of connecting hardware.

Extremely high stiffness-to-weight structures fabricated from materials typically used in aerospace structures such as airframes and satellites can be used in the presented embodiments to achieve critical advantages over more common or less expensive structures. One advantage is to achieve higher natural resonant frequencies of the support structure. This has the combined effect of pushing the fundamental or lowest natural frequency to a higher value and the associated amplitude to a lower value, making such natural resonant vibrations of the structure less noticeable or not noticeable within the camera imagery. Another advantage of the light weight is a lower operator fatigue rate.

Operator self-supported camera position systems using these features can provide the advantages of scene access and maneuverability from a operator support system while providing image stability through a wide range of complex shots.

DETAILED DESCRIPTION OF EMBODIMENTS

The various embodiments according to aspects of the invention are directed to an operator supported camera positioning system. "Operator supported" as used herein means that the system can be borne by an operator either by holding the system through handles or grips, with or without support by the operator's body, such as with shoulder mounts or harnesses or the like. The various structure of the embodiments provide a system that is sufficiently lightweight and stabilized to provide image capture through various complex motions controlled by the operator while holding or otherwise self-supporting the system.

Figure 1:
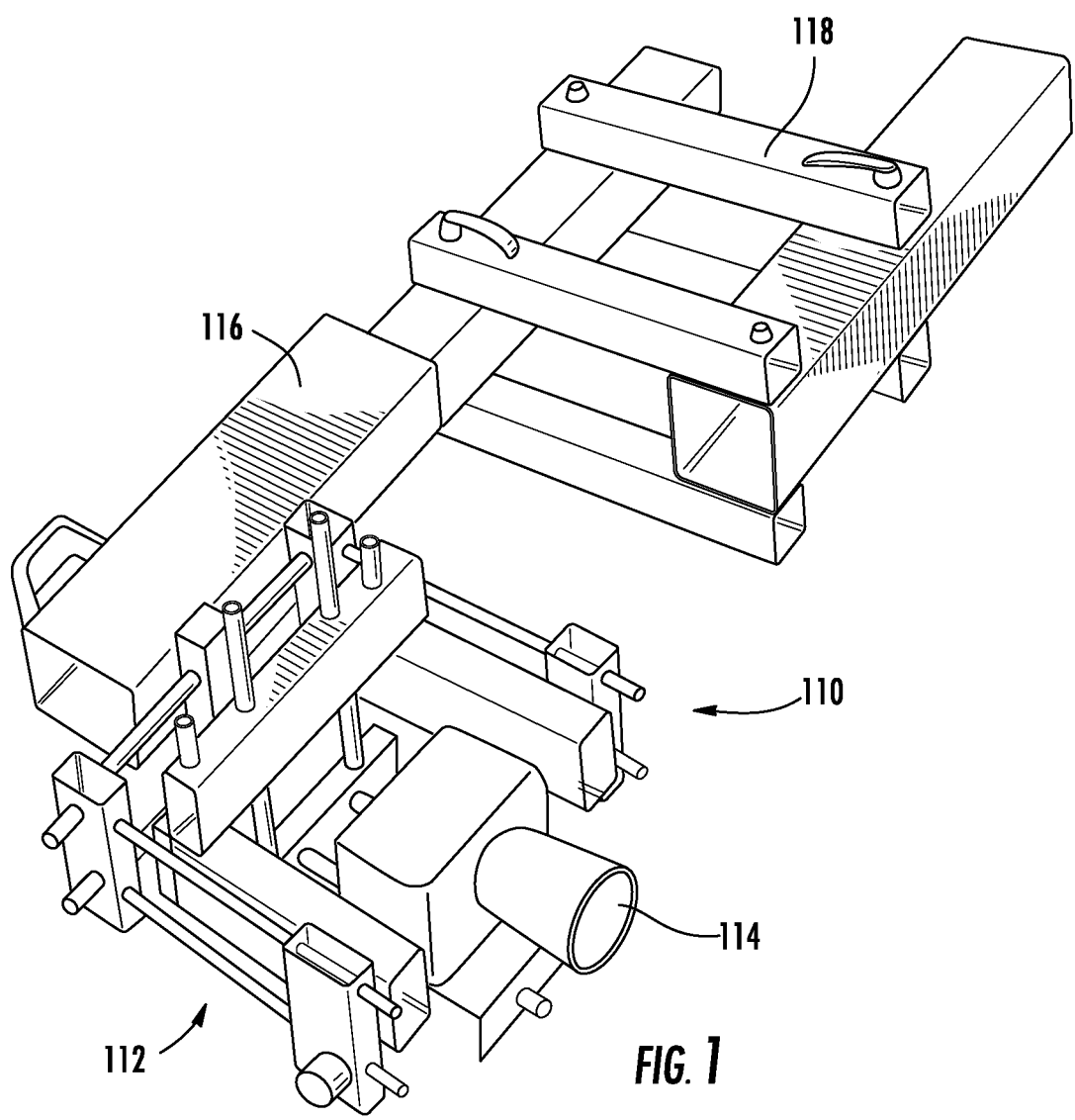
FIG. 1 is an isometric view of a camera positioning system according to aspects of the invention.

FIG. 1 shows an embodiment of an improved positioner 110. The positioner 110 includes a camera platform assembly, such as a pan-tilt assembly 112 supporting a camera 114. An operator interface structure, such as a pan bearing housing 116 rotationally supports the pan-tilt assembly 112. Further extension of the camera range beyond the user's reach can be provided by one or more beam extension components 118.

Detailed description of embodiments of the positioner sections follows, first with a discussion of the pan-tilt assembly 112, followed by a description of aspects of the pan bearing head 116, and finally the beam extension components 118.

It is important to give users the ability to select the camera as a tool separate from the positioner. So focus is on creating a support for a generic payload. Support for camera weight up to 20-25 lbs. is achievable, and current focus is on support in the range of 5-10 lbs., with proof loading to twice this range.

The camera positioner includes a pan-tilt platform and pan bearing head as a modular unit.

Single sided pan fork can provide enhanced camera access, but it requires more structure and thus more weight. One challenge is balance. The camera mount is adjustable laterally and the pan-tilt is laterally adjustable relative to the bearing head. The tilt arm has an adjustable plate to allow vertical adjustment.

The design is simple, has a low parts count and is lightweight, while at the same time maintaining relatively extreme stiffness.

A double sided support carriage that has variable adjustability of the components uses tubular components that are a close tolerance fit to avoid the complexity and weight of fasteners. The tight fit tubular assembly is scalable to provide support for a wide range of camera size classes and with different stiffness requirements.

Figure 2:
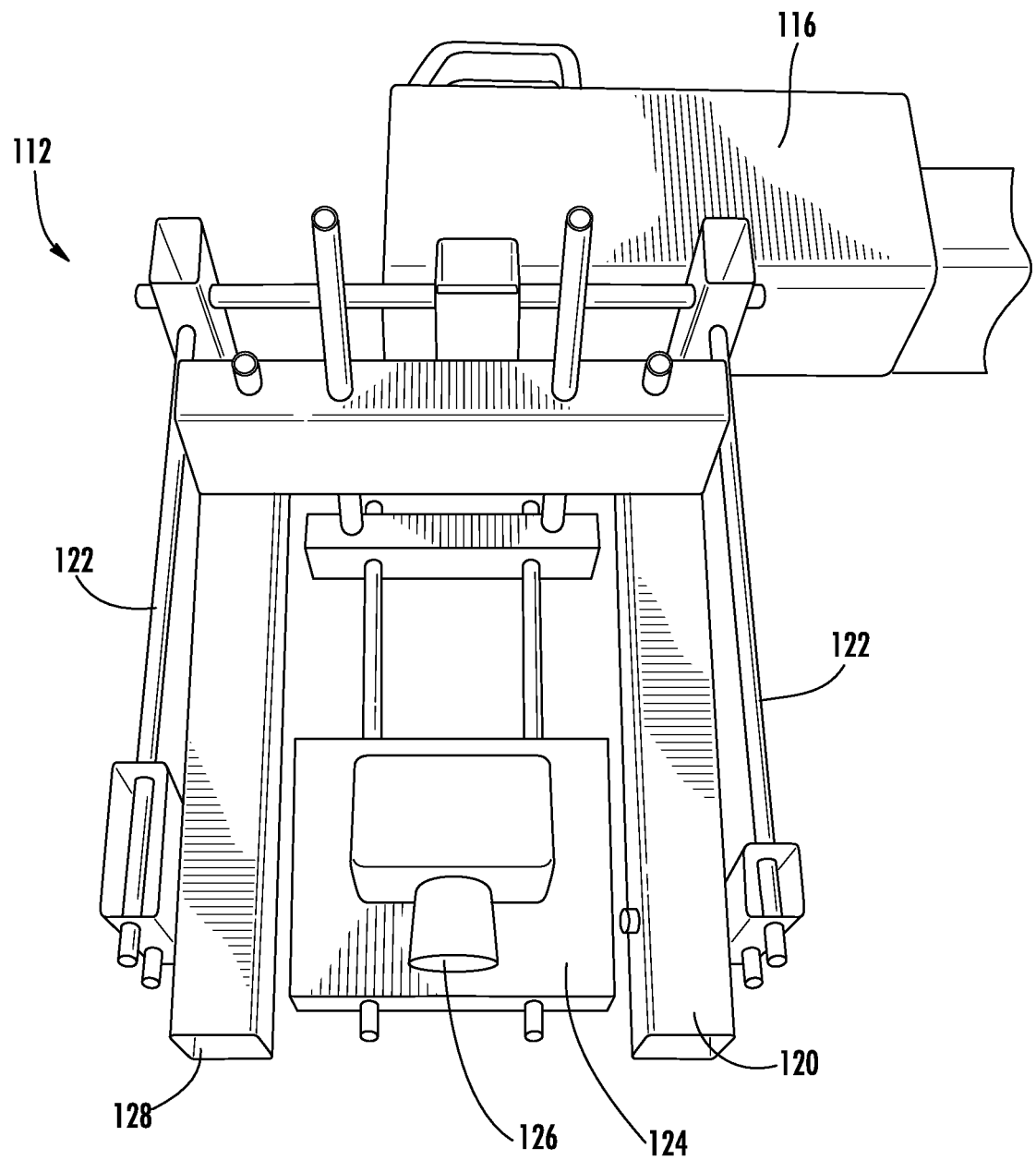
FIG. 2 is a close-up perspective view from above the camera platform assembly of the camera positioning system as shown in FIG. 1.

FIG. 2 shows the pan tilt assembly 112 under the pan bearing housing 116. A tilt carriage 120 is nested between one or more arms, such as the pan fork stanchions 122. A camera mount, such as a platter 124 can support a camera 126. The camera platter 124 can provide a flat surface for accommodating cameras of different types and any associated mounting fixtures. The tilt carriage 124 can be connected to the stanchions 122 by axle tubes 128 for rotation about a first axis of rotation.

Figure 3:
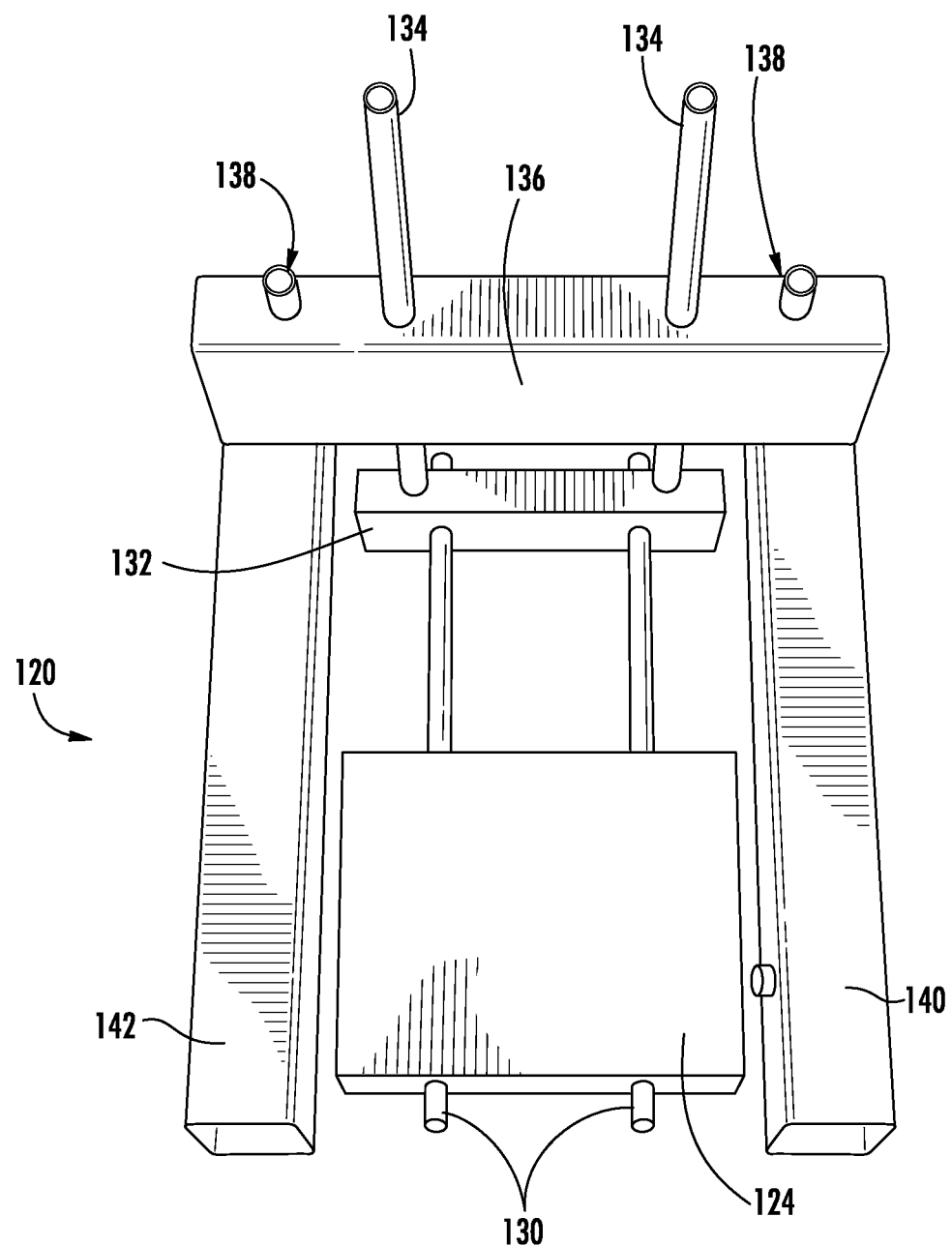
FIG. 3 is a top perspective view of a camera platform assembly for use with a camera positioning system as shown in FIG. 1.

FIG. 3 illustrates a camera platform assembly embodiment that is adjustable. The tilt carriage 120 supports the camera platter 124 and fore and aft rails 130, which can be fixed to a lower cross bar 132. Risers 134 can be fixed to the lower cross bar 132 and extend to slidably connect to an upper cross bar 136. Pins 138 can secure a "drive" side tilt arm 140 and a "cable" side tilt arm 142 to the upper cross bar 136.

Figure 4:
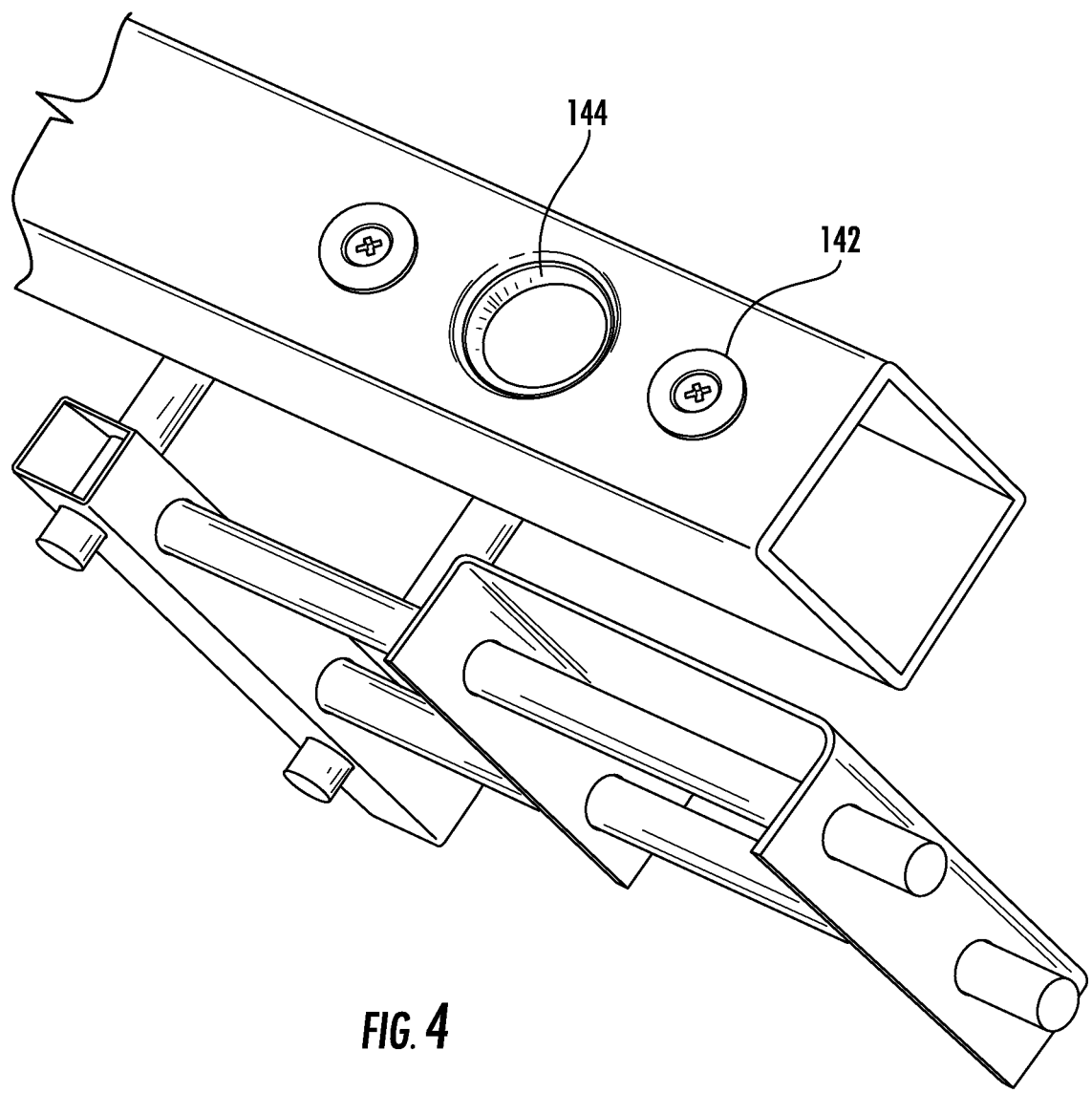
FIG. 4 is a close up perspective view of tubular component used in the construction of the camera platform assembly of the camera positioning system as shown in FIG. 1.

FIG. 4 shows a close up of an embodiment of the cable-side tilt arm 142. The tilt arm 142 has a tilt bearing surface 144. A similar bearing surface can be provided on the drive side tilt arm 144 (not shown). The tilt arms 140, 142 can have divided functions, with the cable-side tilt arm 142 supporting cable-pass through while the drive side tilt arm 140 supports the tilt drive and associated electronics. The tilt arms 140, 142 can be hollow and can be tubular carbon fiber components. The tilt arms 140, 142 can be the same size.

Figure 5:
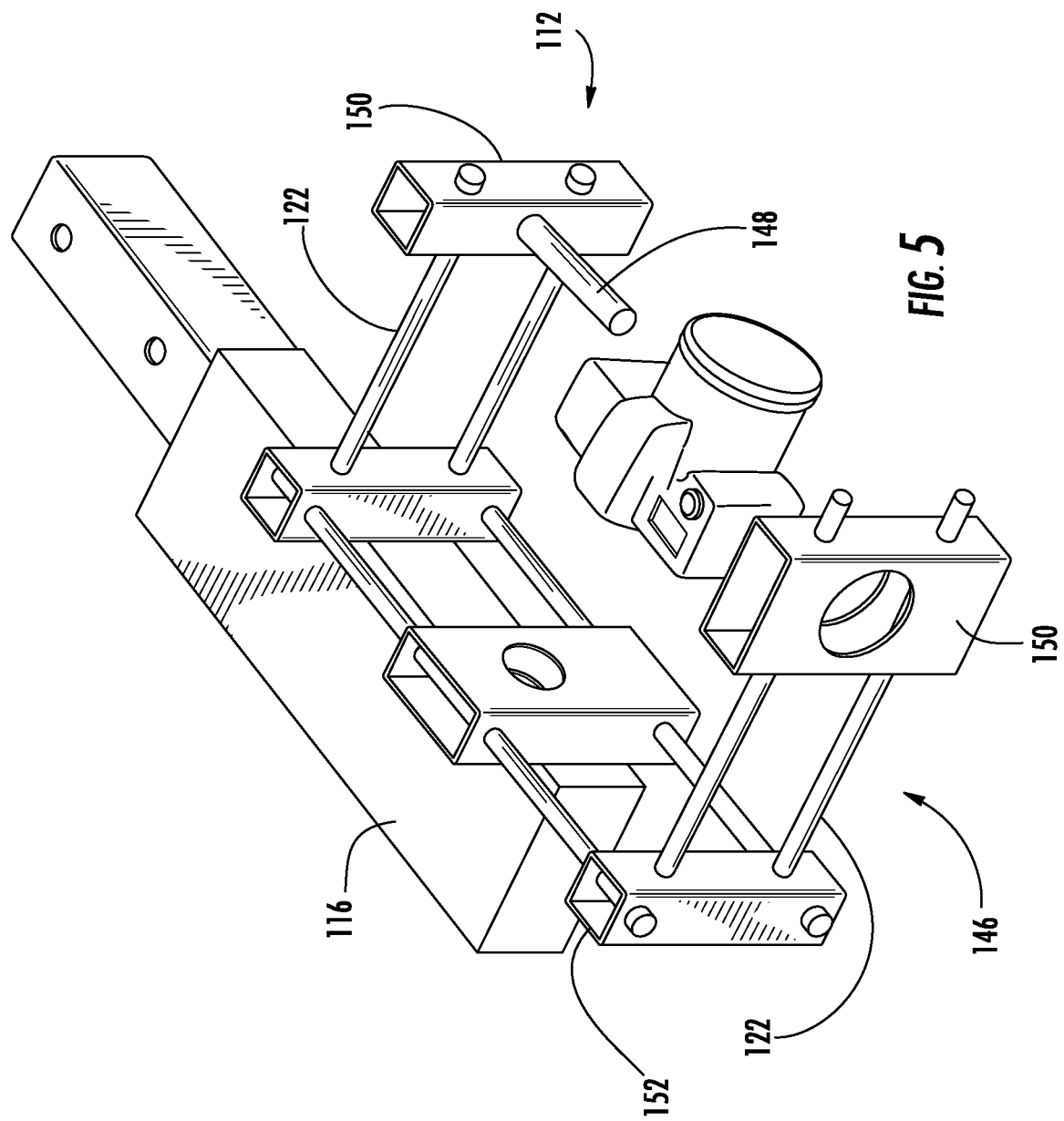
FIG. 5 is a disassembled perspective view of the camera positioning system as shown in FIG. 1.

FIG. 5 shows a pan portion 146 of the pan tilt assembly 112 with the tilt portion removed for ease of illustration. A drive side tilt axle tube 148 connects to a tilt axle mount 150, which is slidably adjustable on the stanchions 122. A tilt axle mount 150 can be provided on the opposing drive side to support a cable side tilt axle tube. The opposing sets of stanchions 122 depend from a pan fork crown 152.

The pan tilt assembly 112 can be constructed throughout from the camera platter 124 to the pan fork crown 152, with an assembly of rectangular hollow carbon fiber composition tubes interconnected with titanium tubes. Some of the connections are slidably adjustable to allow for dynamic balancing of the rotating pan tilt assembly 112. This design technique minimizes the need for conventional fasteners, and avoids the associated weight and design complexity.

Figure 6:
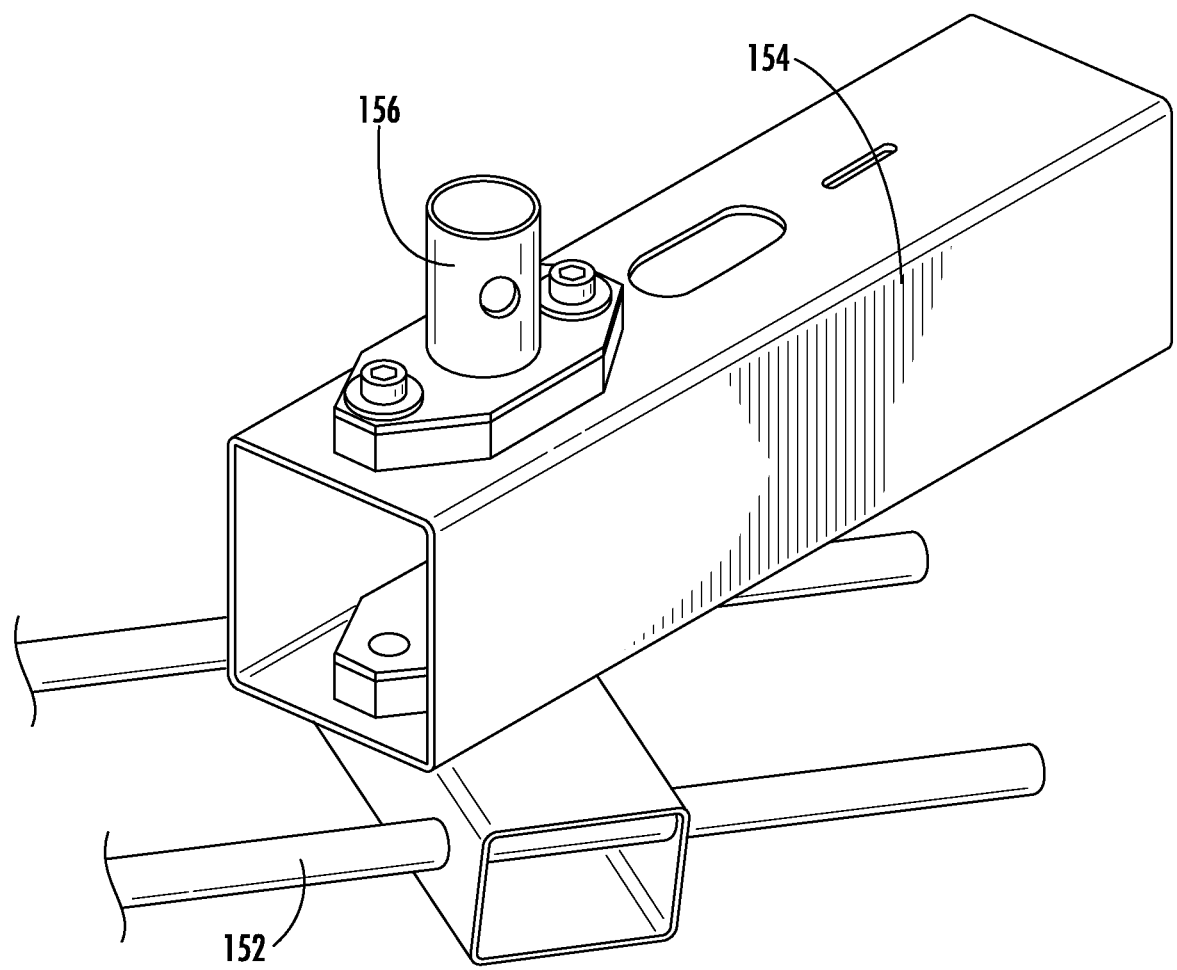
FIG. 6 is an isometric view of a portion of a pan fork crown rotatably connected to a pan drive module for the camera positioning system as shown in FIG. 1.

FIG. 6 shows a portion of the pan fork crown 152 rotatably connected to a pan drive module 154 using a pan axle tube 156 that engages a bearing surface on the pan drive module 154. The pan axle tube 156 should be sufficiently large for cable pass through.

Figure 7:
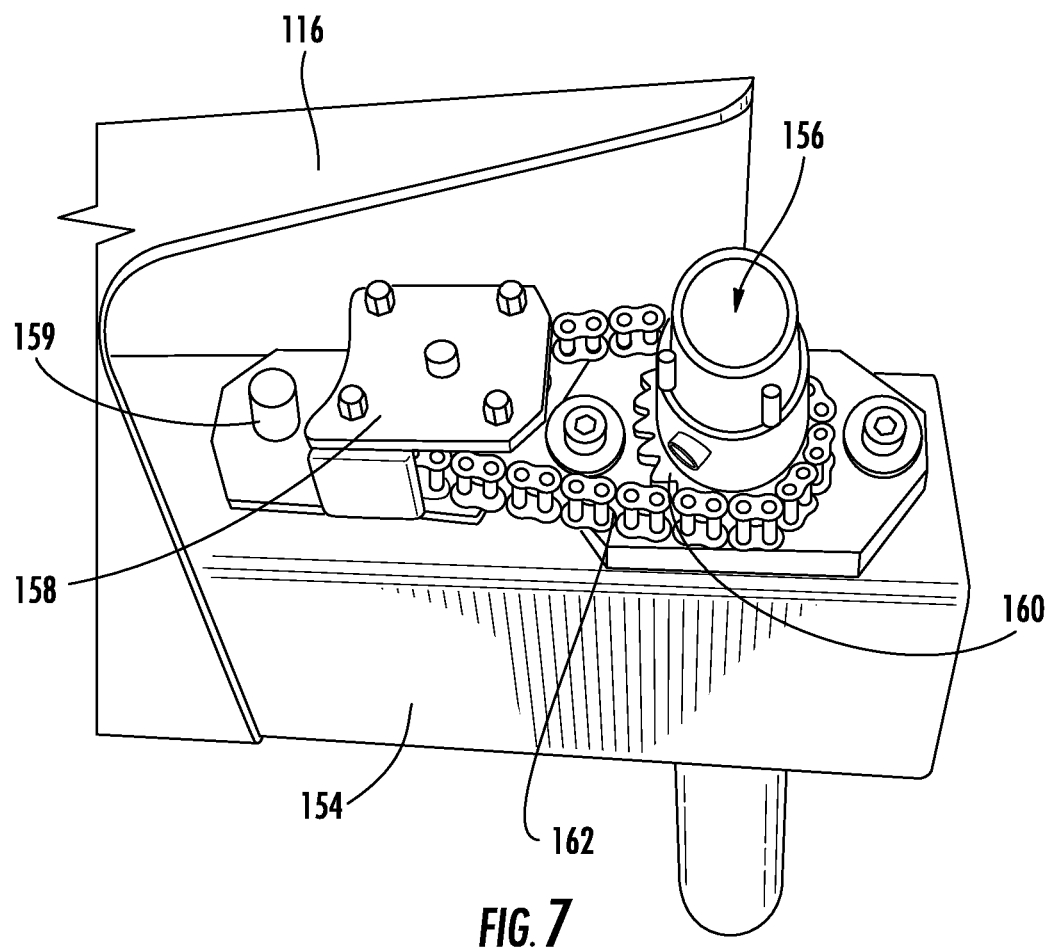
FIG. 7 is a perspective view of a pan drive module for the camera positioning system as shown in FIG. 1.

FIG. 7 shows an embodiment of the pan drive module 154. A gear box 158 is mounted on the drive module 154. A sprocket hub 160 is mounted on the pan axle tube 156. The sprocket hub 160 and the gear box 158 can be coupled by a chain 162. A chain tensioner 159 made up of a slotted plate and bolt connected to the gear box 158 can be adjusted to maintain appropriate tension in the chain 162. The tensioner 159 serves the additional benefit of overload protection to the drive components by slipping on overload to relax tension in the chain. The pan drive module 154 can be enclosed by the pan bearing housing 116. The opposite end region of the pan drive module 154 can also be used as an enclosure for system electronics and cabling.

Figure 8:
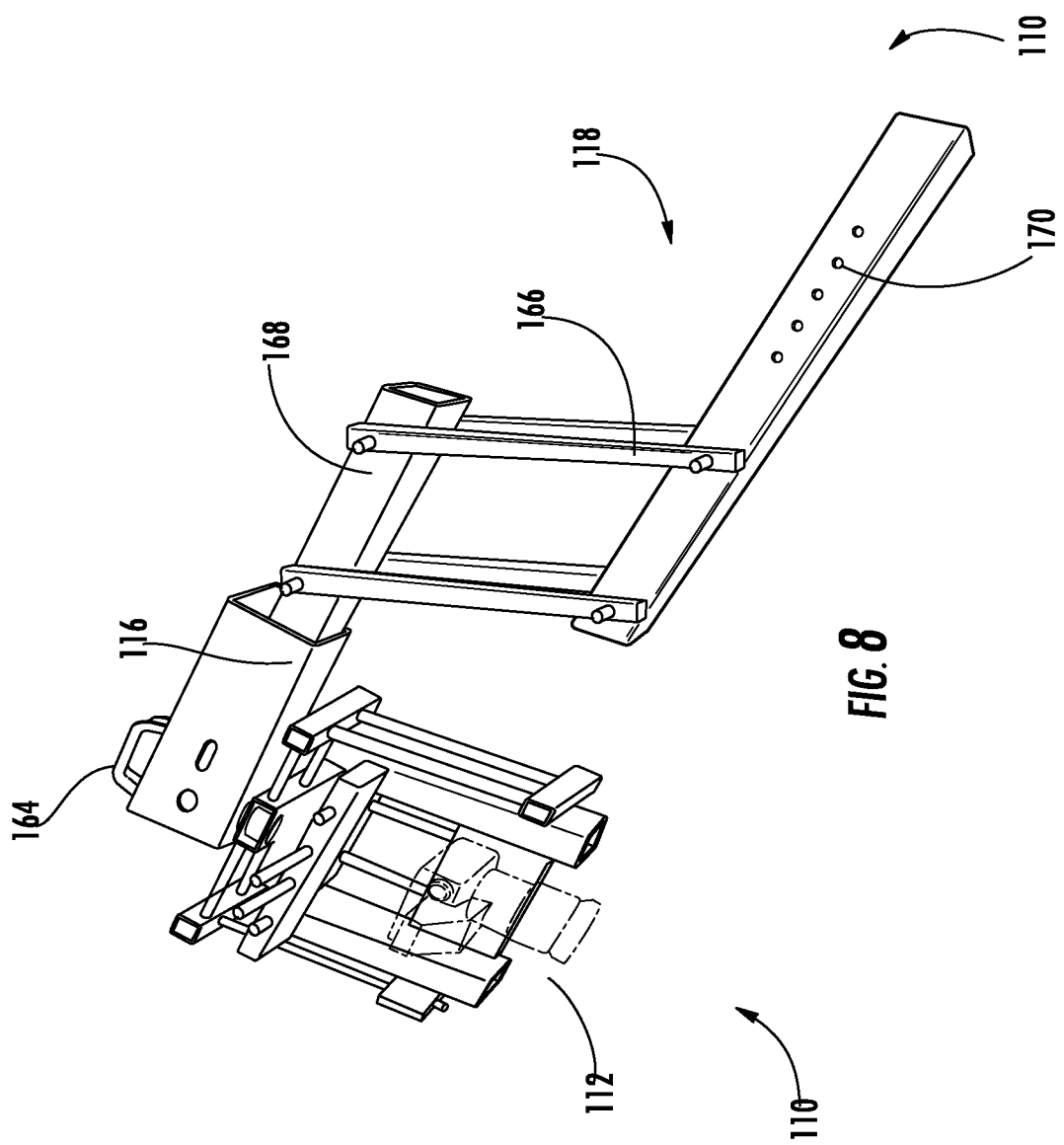
FIG. 8 is another perspective view of the camera positioning system as shown in FIG. 1.

FIG. 8 shows the positioner 110. The pan bearing housing 116 can support the pan tilt assembly 112 through the pan drive module enclosed in the pan bearing housing 116. The pan bearing housing 116 can also enclose a battery and mounts for further electronics, a monitor and associated cabling. The pan bearing housing 116 can also provide handle 164 to allow a user to support the positioner 110 through the pan bearing housing 116 as an operator interface. Further handle structure such as a removable tubular handle (not shown) can be attached to the pan bearing housing 116.

The pan bearing housing 116 can also be coupled to the beam extension component 118. The beam extension component 118 can be constructed with rectangular carbon fiber-resin tubes interconnected into a parallel linkage configuration. The tubes can include diagonals 166 for adjustable connection to parallel axial extensions including a distal extension 168 and a proximal extension 170. The adjustable connections can include rotatable pins and cam lever quick releases for clamping the diagonals 166 in a fixed mode.

The adjustable parallel offset between distal extension 168 and proximal extension 170 allows for placement of the combined center of mass of the pan tilt assembly 112 substantially coincident to the axis of the proximal extension 170 to reduce the support forces required of the user.

The proximal extension 170 can serve as a handle for support and control by the user. The handle functionality can be enhanced with further handle structure (not shown) removably attached to the proximal extension 170. Alternatively, a further extension module (not shown) can be attached to the proximal extension 170.

Referring again to FIG. 1, the pan tilt assembly 112 can be adjusted in all three dimensions to achieve dynamic balancing. As the payload, such as a camera, is changed or components such as the lenses are changed, the dynamic balance of the pan tilt assembly 112 with the payload can be adjusted. It is important to maintain the combined center of gravity of the pan tilt assembly 112 and payload along the longitudinal axis of the positioner 110. As the components of the pan tilt assembly 112 are adjusted to achieve dynamic balancing, the center of gravity of the assembly may be offset from the longitudinal axis of the positioner 110. The beam extension parallel linkage can be adjusted to realign the combined center of gravity along the longitudinal axis of the positioner 110.

The design allows tailored performance specification without alternating design configuration. Strength and stiffness for example can be enhanced by increasing the wall thickness in the various structural tubing used as basic components throughout the positioner 110.

The control circuitry for the positioner 110 can include a wireless interface between the user input controls and the actuating circuitry for the pan tilt and camera functionality. In this arrangement, a receiver can be supported in the pan bearing housing, the pan drive module or on the pan tilt assembly. The user input control can include a transceiver. With a wireless interface, the user input control can be located on the device accessible by the operator, on the operator or other remote location. The wireless interface can also accommodate down-link telemetry from one or more of the positioner components and the camera.

Among the control circuitry, the positioner 110 can include inertial transducers including an angular accelerometer for each axis of the pan tilt assembly. Each inertial transducer can be used in an active feedback control loop to stabilize payload in the pan tilt assembly through signals to the motor controllers of that assembly. The operator supported positioner enables the operator to override the active feedback control loop with user inputs.

The pan tilt carriage can include a one-sided cantilever camera support design. Alternatively, a two sided assembly can be provided as described above.

The one-sided design allows for easier camera access but requires balancing adjustments along three axes for changes in camera payload, including for example, changes of lenses.

The assembly is scalable to accommodate payloads of different lengths, widths, heights and weights.

Figure 9:
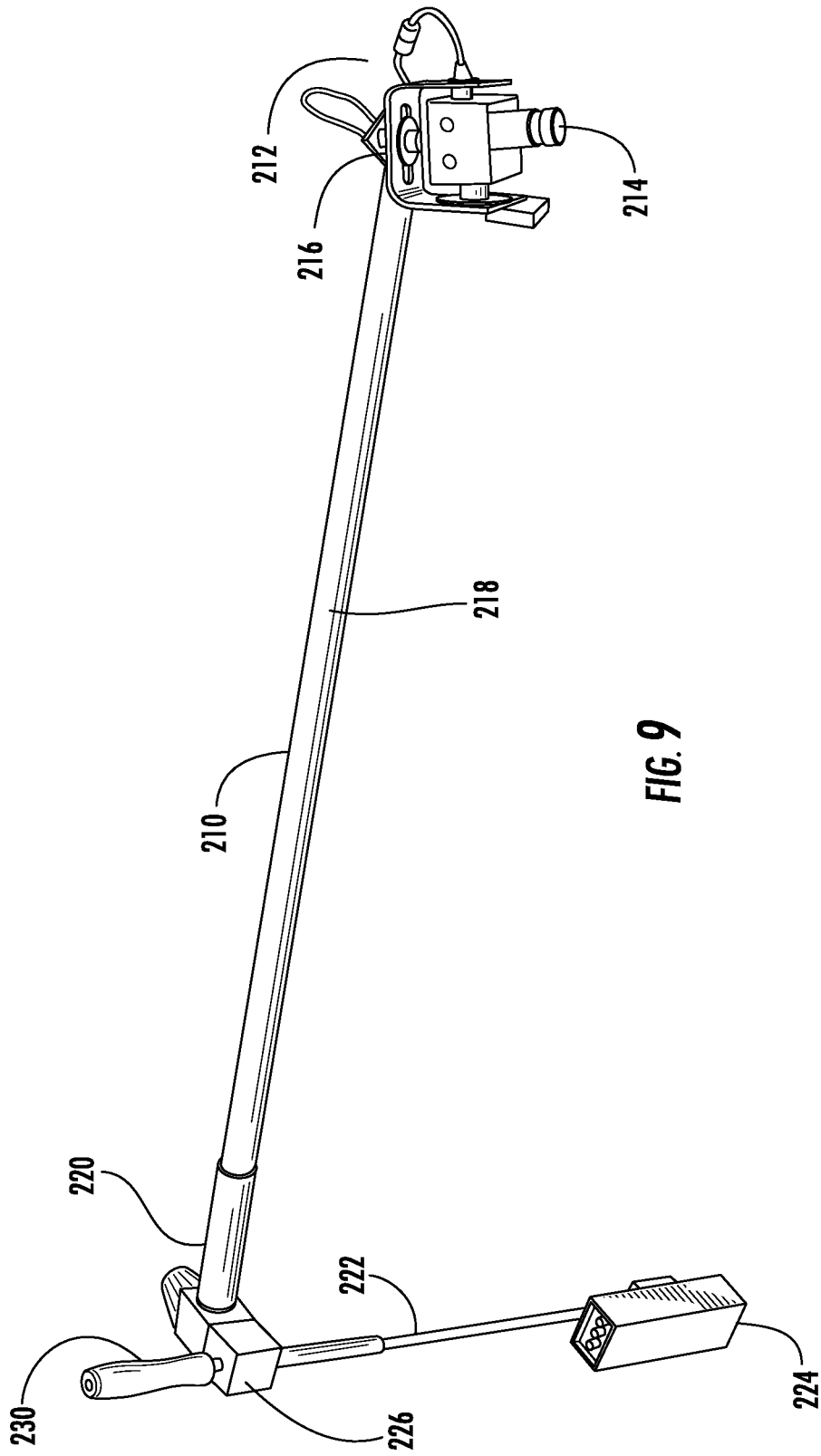
FIG. 9 shows another embodiment of a camera positioning system according to aspects of the invention.

FIG. 9 shows another embodiment of an improved positioner 210. The positioner 210 includes a camera platform assembly having pan-tilt assembly 212 supporting a camera 214. A pan bearing assembly 216 rotationally supports the pan-tilt assembly 212. Extension of the camera range beyond the user's reach can be provided by one or more beam extension components 218. The positioner can be held and controlled by holding the beam 218 along its length and a pan control assembly 220. A reference post 222, an electronics control box 224 secured at one end of the reference post 222, and an interface 226 for connecting the reference post 222 to a pan control knob axle tube can be provided. The interface 226 can be adjustably slidingly connected to the reference post 222 and can be secured, for example by an adjustable lock collar and a friction fit rubber grommet.

At the other end of the reference post 222, a control stick grip 230 can be mounted to use the reference post 222 as a handle and manual control for the positioner 210.

Figure 10:
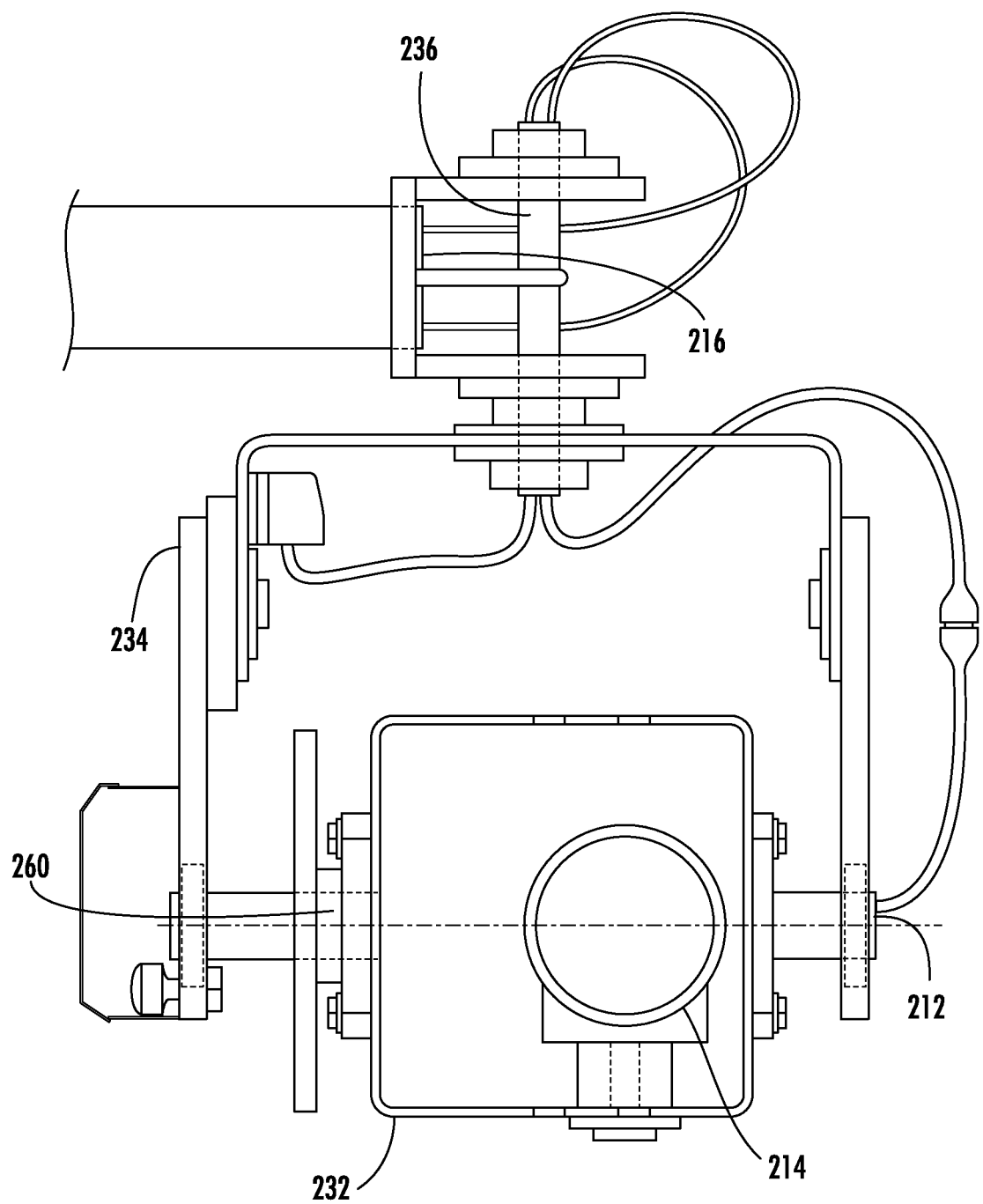
FIG. 10 is a perspective view of the front end assembly of the positioner, showing a camera mounted on the pan/tilt assembly.

FIG. 10 is a side view of a front end assembly of the positioner, showing a camera mounted on the pan/tilt assembly. The camera 214 can be secured to a camera mount, such as platform surface of a tilt cradle 232 rotationally nested within a pan bracket 234. The pan bracket 234 is supported by the pan bearing assembly 216 that includes a distal pan bearing tube 236.

Figure 11:
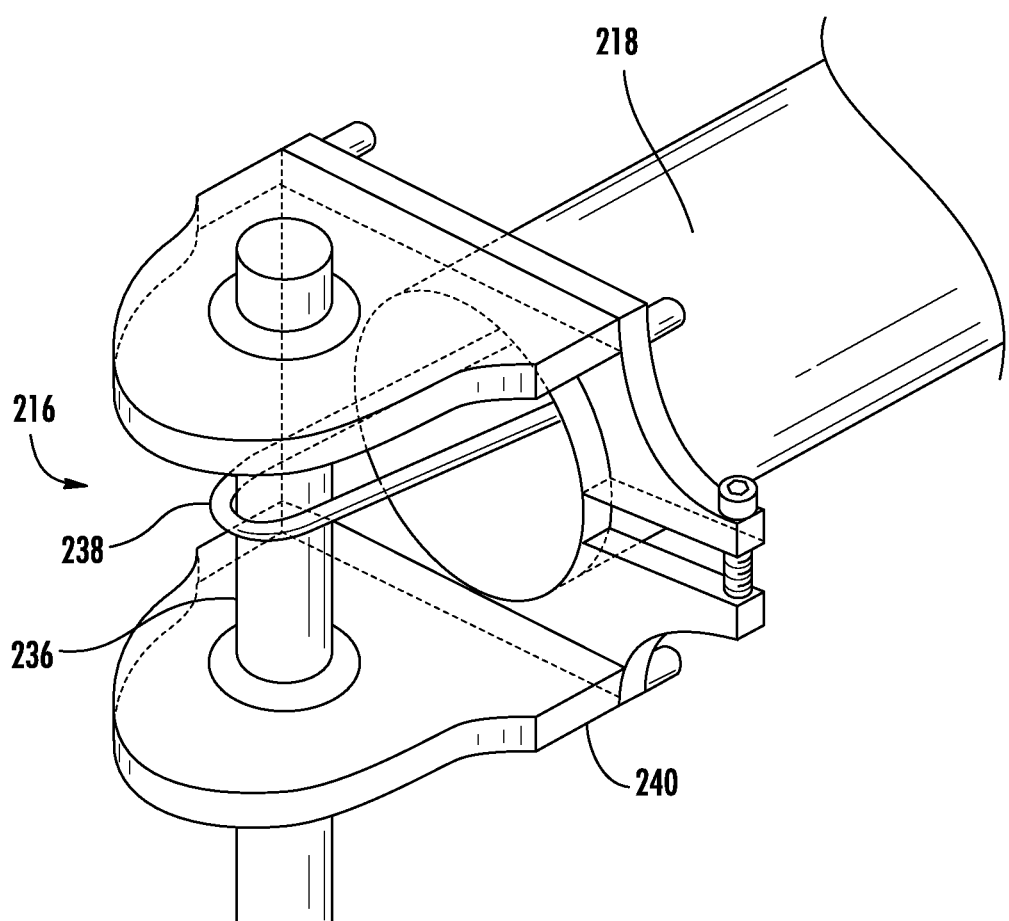
FIG. 11 is a closer perspective view of the distal end of the positioner of FIG. 9.
Figure 12:
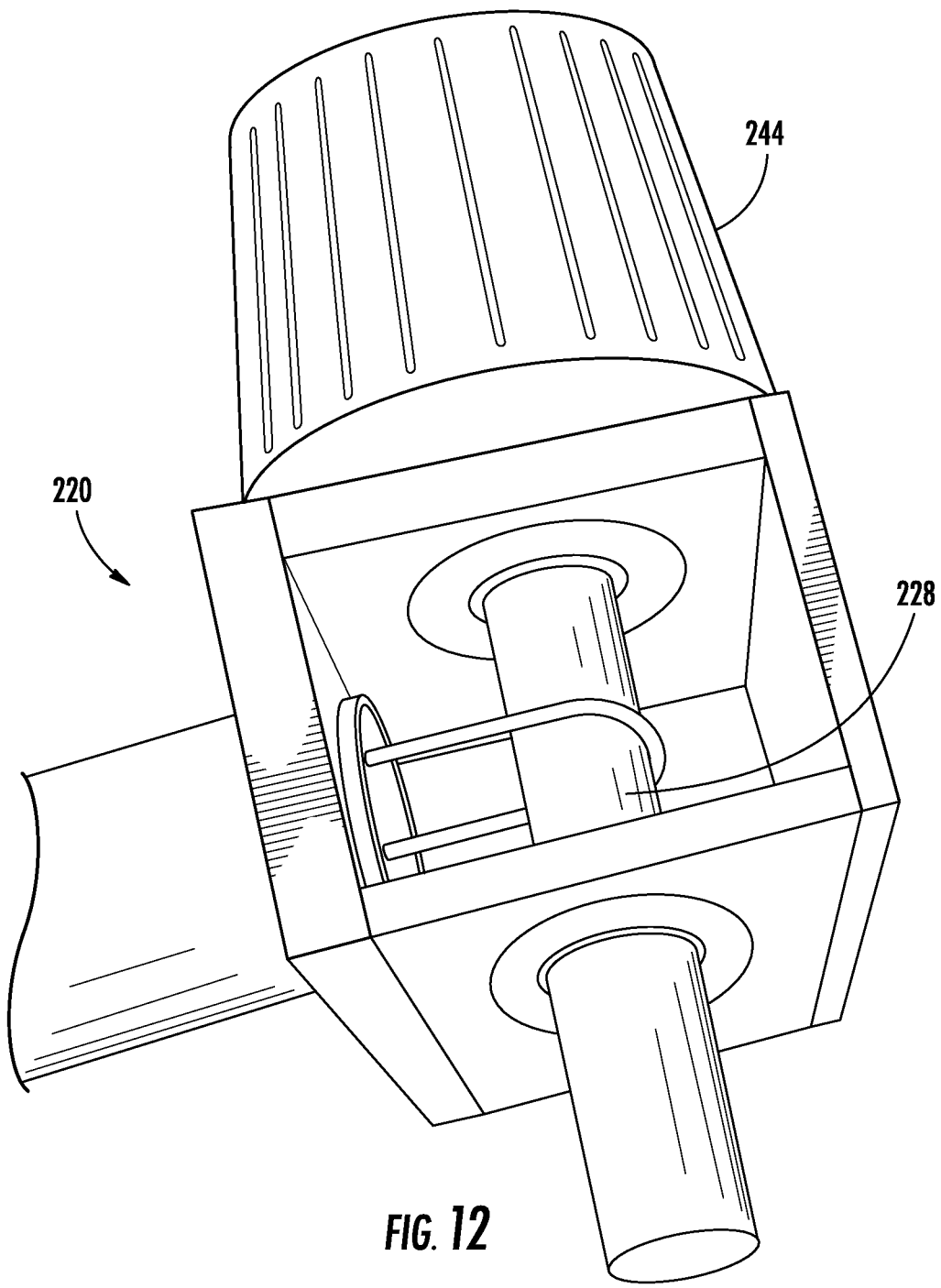
FIG. 12 is a closer perspective view of the proximal end of the positioner of FIG. 9.

FIG. 11 is a closer isometric view of the distal end of the positioner showing more details of the pan bearing assembly 216. FIG. 12 is a closer perspective view of the proximal end of the positioner showing more details of the pan control assembly 220 and the pan control axle tube 228. The distal pan bearing tube 236 is rotationally mounted to the end of the beam component 218 with an appropriate bearing 240. Proximal control of the rotation of this distal pan bearing tube 236, and thus the pan/tilt assembly mounted to it, from the user end of the positioner can be provided by a mechanical coupling, such as a cord loop serving as a pull-pull mechanical control cable 238 extending between the pan control axle tube 228 and distal pan axle tube 236. Because the pan control axle tube 228 has a relatively small diameter, the pull-pull cable loop 238 must be in tension to generate sufficient control torque. One approach is to tension the cable 238 with a tension spring joining the cable ends to form a continuous loop between the pan control axle tube 228 and the distal pan axle tube 236.

The cable linkage also allows slippage in the event of the impact or jamming of the assembly, allow for easy reset.

The pan tilt assembly can be sized and spaced to readily disassemble rather than break under impact, again allowing for relatively easy reassembly after an accidental impact or the like.

The primary axis degree of freedom in pan is achieved through the pull-pull cable. This stabilizer is passive as it translates gravity leveling through a mechanical linkage. The tilt control is active inertial stabilization through electronic servo control. The pan tilt assembly can include a tilt servo, with selectively engageable gear assembly.

In one basic embodiment, the camera positioner presents an intuitive control system that enables linked camera pointing through a mechanical or electro-mechanical linkage, such as a pull-pull cable linkage between a control tube and a distal pan axle tube for adjusting pan of a pan/tilt assembly to which the camera is mounted.

In such an embodiment, tilt can be effected through rotation of the beam element.

This completely mechanical embodiment can be suitable for underwater applications.

Use of thin walled titanium tubing for the beam element and low mass composite materials can result in a nearly neutrally buoyant positioner.

From this basic embodiment, the pan control can be achieved through a knob 244 mounted to the proximal pan control tube 228. This knob 244 can include an index point mark. Because of the linkage between the pan control tube 228 and the distal pan tube 236, the index marker on the knob can represent the camera pointing direction, independent of the motion of the positioner beam element.

Figure 13:
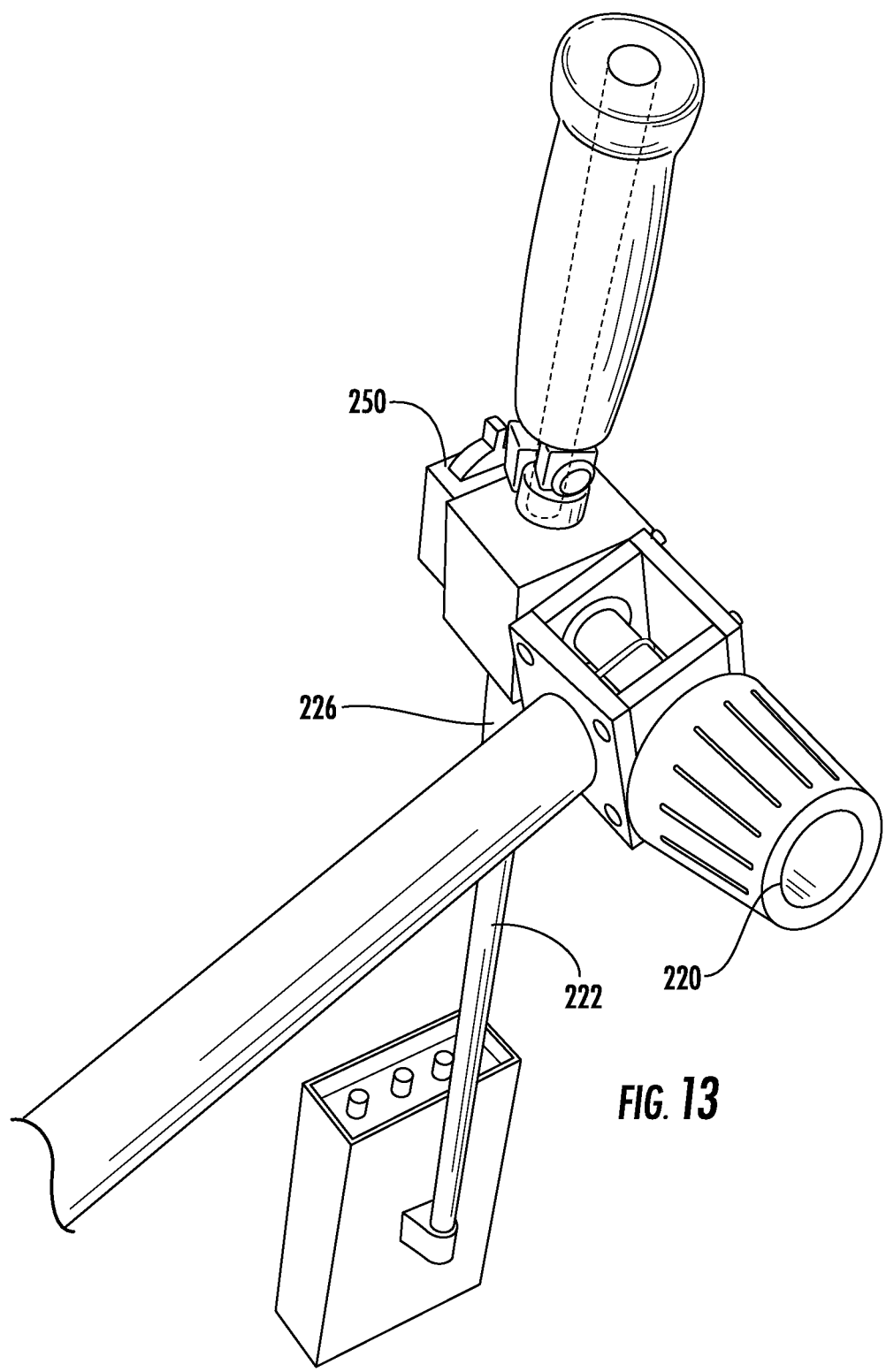
FIG. 13 is another close up perspective view of the proximal user control end of the positioner of FIG. 9.

FIG. 13 is a close up isometric view of the proximal user control end of the positioner. The pan control can be further modified to include the use of a gravitational inertial control device such as the reference post 222 that can be mounted to the proximal pan control tube. The reference post 222 can be weighed to be self-leveling to vertical. Through the cable linkage, the vertical centering of the reference post 222 can maintain leveling of the camera and particularly the horizontal horizon of the camera as the camera is translated with the beam element.

As a result, the spatial orientation is maintained between the reference post 222 and the pan tilt assembly. This preferably parallel orientation is achieved through a cable linkage, rather than a rigid mechanical linkage. As the pendulum of the reference post 222 is allowed to seek vertical, it maintains the horizontal horizon of the camera. In other words, the weighted reference post 222 auto-levels the pan tilt platform for the camera.

This auto-leveling is possible when the pan or primary axis is held parallel to the horizon, making rotation about the primary axis appear as roll in the camera image. Level horizon is often desirable for image quality concerns, so any system either passive or active which achieves this adds value to the platform.

As mentioned above, tilt control in a basic form can be achieved by a rotation of the beam element. The tilt can also be achieved through a servo control system. The servo control system can include a hand control input device such as a Hall effect input controller to send signals to a servo arranged on the pan tilt assembly to adjust the tilt aspect of the camera platform. The servo can be positional or preferably a rate controlled servo system. A control input, such as a toggle, can also be provided and mounted adjacent to the control stick grip.

Servo drive using a common servo product allows for several advantages. First, the servo and many of Point Of View (POV) camera products run on 5 volt power supply, which requires no fuse protection at that relatively low voltage. The low voltage wiring is also very commonly available, resulting in a low cost, easy to terminate and configurable to a custom length, and requiring no shielding at the relatively low frequencies of the digital control signals which drive the common servo.

According to several aspects of the invention, the control signaling to the servo can contain a number of elements. Preferably, a continuous rotation servo that is rate controlled is used.

The control signal is user originated through an inputter (input device), such as spring loaded self-centering linear voltage toggle.

The servo, such as the tilt servo 260 (see FIG. 10) is controlled by the control inputter, such as the spring centered bidirectional toggle Hall controller that sends an analog control voltage signal to the servo through signal conditioning electronics. The signal conditioning electronics can be housed in a signal electronics housing 224 that can also serve as a weighted end to the reference post 222 (see FIG. 9).

The signal conditioning electronics can include: an inputter to provide an analog voltage control signal and a scaler in the form of speed control.

In parallel to the control input can be a trim control that adjusts the signal level to a zero velocity when the hand control is self-centered to the middle position by controlling a bias above or below the center voltage.

An accumulator in the form of a capacitor can also be provided to control the rate of acceleration and deceleration of the tilt motion when the hand control toggle is used to command motion or stop. This conditioning allows for smoothing of the tilt motion and avoiding jolts and associated poor imaging. The degree of acceleration and deceleration can be adjusted by a user selectable rate, even when the control input is allowed to spring to center when released from a deflected position.

This analog signal processing can be converted to a digital signal by a servo driver product designed to generate a Pulse Width Modulation signal based on a user selected position, or in present embodiment based on the analog voltage of the above described analog components.

The digital control system can also include a direction reversing control. This direction reversing can also be trimmable, so the reversed PWM signal may also be trimmed to zero velocity when the control input device is undeflected.

The electronics control box 224 can provide various control knobs for adjustable parameters through potentiometers, such as the scaler, the trim controls and a switch for reversing the digital servo drive signal.

The digital signal processing can preferably also include programmable functionality for setting exponential or non-linear response for softening of response near center travel of the control input device and steeper response near the limits of the control input travel.

Figure 14:
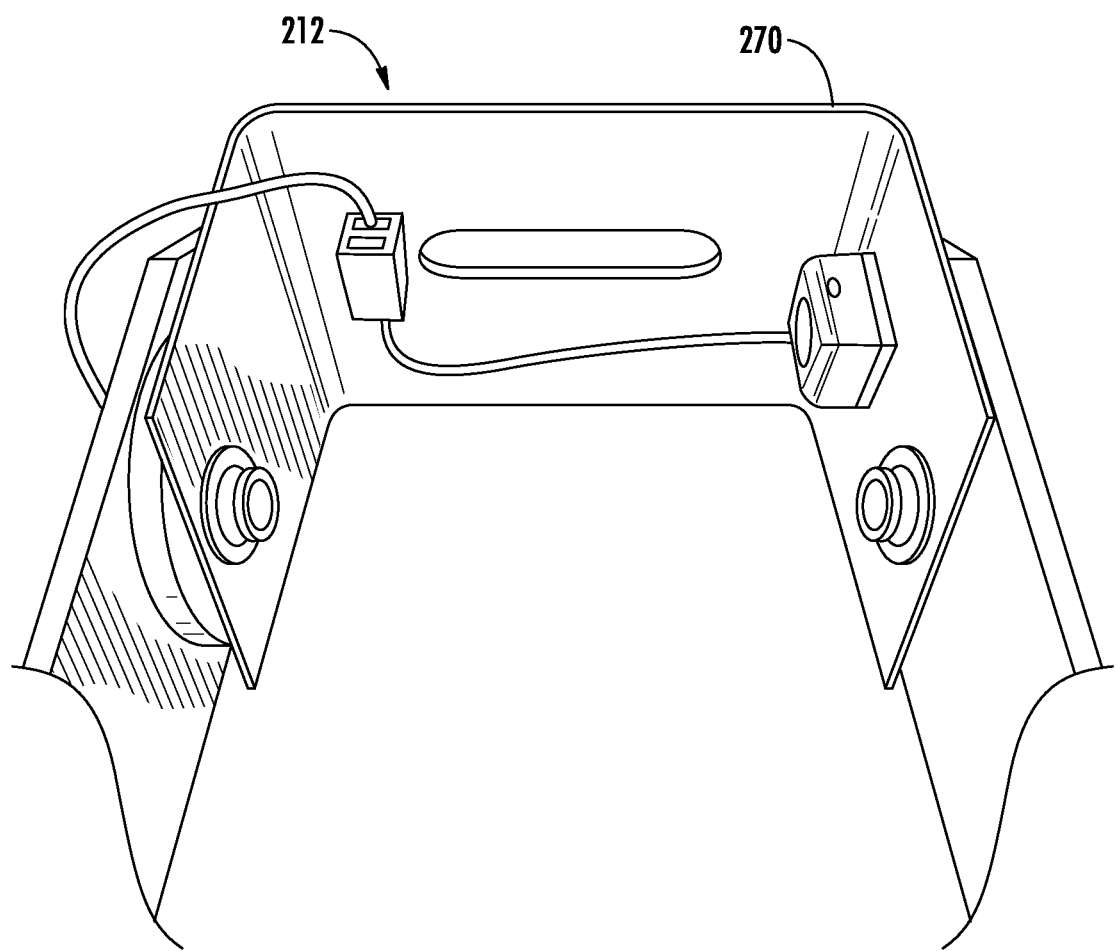
FIG. 14 is a close up view of the pan tilt assembly of the positioner as shown in FIG. 9, showing a location for a gyro inertial transducer.

According to aspects of the invention, the conditioned control signal is not sent to the servo but rather to a decider in the form of a gyro control 270 that is preferably placed on the pan/tilt assembly 212 as shown in FIG. 14.

The gyro control 270 provides camera pointing stability. Preferably, the gyro control 270 allows for signal mixing. If there is no user generated pointing control signal, the gyro control 270 can control and maintain a preset pointing direction for the camera. As user pointing control level increases, the gyro control 270 allows the user originated control signal to dominate.

The gyro control 270 can utilize inertial sensory signal systems such as a MEMS transducer to sense camera pointing position and maintain camera pointing.

User adjustable gyro gain adds to valuable functionality in the form of foreground tracking, as described below. A gyro gain feature allows adjustment of automatic camera pointing. If the gain is set to zero the pointing of the camera is controlled completely by pointing motions of the beam element for the axis in question. As the gain setting is increased, the camera pointing becomes more independent of the beam element pointing motion. Further increase of the gain eventually results in inertially fixed pointing regardless of beam element motion. This gain level may be referred to as "unity gain". At unity gain, the camera always points in the same direction, toward the same distant location.

Further increase in the gain setting above unity results in overcompensation of camera pointing. In this situation, the camera points toward some location less distant from itself. This may be referred to as the distance to the subject, or the "subject distance". The farther above unity gain, the less the subject distance. The effect is called foreground tracking. Foreground tracking involves pointing of the camera at some foreground subject while the boom itself swings through some angle containing the direction toward that foreground subject. The distance to that subject may be matched by the appropriate setting of the gain, allowing "hands off" tracking of the subject by the camera.

An alternative linkage can be used for coupling the pan control system at the user end to the distal pan control tube. Rather than a mechanical linkage, such as the cable loop, a distal motor can drive a gear train connected to the distal pan axle. The distal motor can be controlled by an electronic signal delivered by wiring from a control input at the proximal user held end.

Combinations of the above mechanical and signal control features can present a variety of options in camera positioning and stability control in a hand-held image acquisition environment.

Figure 15:
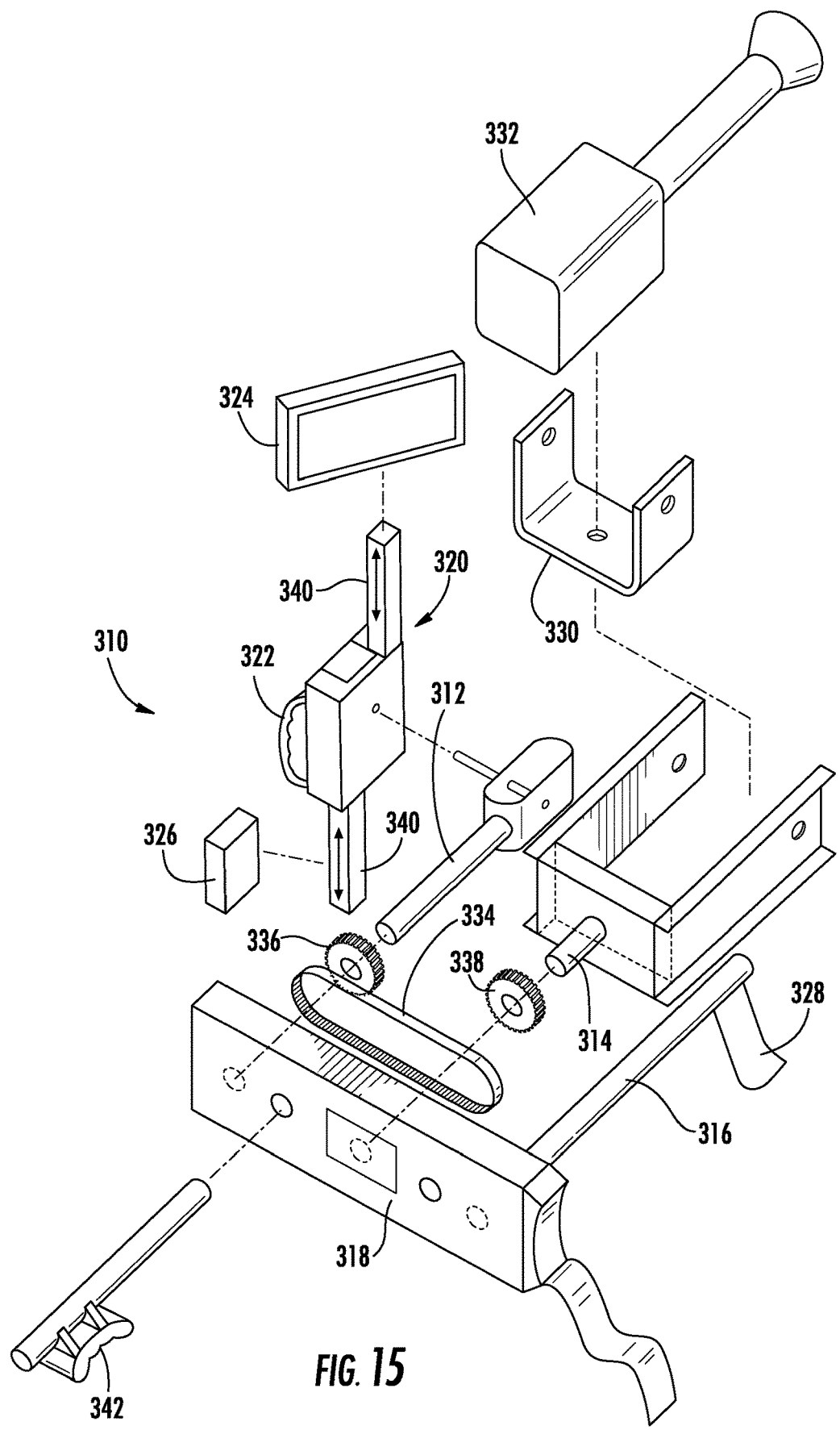
FIG. 15 is a perspective view of a further embodiment according to aspects of the invention.

Referring to FIG. 15, another embodiment according to aspects of the invention is referred to as the "Camera Workstation." This positioner 310 can be a solution for field production applications where the camera operator is often moving on foot or on a moving platform, such as a motorcycle sidecar, a boat, a truck or an aircraft. It is designed for today's physically large broadcast production cameras, typically having multi-servo zoom telephoto lenses.

The device 310 can have three parallel extended members 312, 314 and 316 arranged in a planar configuration and perpendicular to a crossbar 318 at the rear of the device 310. One of the two outboard extended members 312 supports a pivotally mounted reference post 320 having multiple grips 322 and extendable attachment structure for both a monitor 324 and a battery 326. The opposite outboard extended member 316 can also have a grip 328 movably and lockably attached at or near the end opposite the crossbar (forward end) allowing for adjustment of the grip line (line between the grips) to fall on the center of mass of the device while supporting the camera payload.

The center parallel member 314 can support a pivotally mounted tilt carriage 330 for the camera payload 332. The range of motion of this pivot need only be the lesser fraction of a full circle.

The reference post extension 312 and the camera support extension 314 are both operatively connected to the crossbar 318 by bearings which allow those extensions 312, 314 to rotate about their long axes relative to the crossbar 318. The reference post extension 312 and the camera support extension 314 are also operatively connected to each other via a timing belt 334 between two timing belt pulleys 336, 338 of equal diameter, one pulley 336, 338 removably attached on each of those extensions 312, 314.

The effect of the timing belt 334 and associated pulleys 336, 338 is to couple the roll angle of the camera extension 314 to that of the reference post extension 312 and therefore to the roll angle of the reference post 320 itself, making the camera roll angle independent of the crossbar roll angle. This configuration couples the roll angle of the camera 332 to the roll angle of the reference post 320 through the timing belt 334 and timing pulleys 336, 338, which also couples the roll displacement of the camera 332 to the roll inertia of the reference post 320. The reference post 320 has extendable portions 340 for both the monitor 324 and the battery 326, which allow for addition of substantial roll and tilt moment of inertia to said reference post 320. The roll inertia of the reference post 320 stabilizes the roll motions of the camera 332 through the coupling of the timing belt 334 and timing pulleys 336, 338.

An optional feature of the device is a pitch or tilt control. Tilt of the reference post 320 may be sensed with a gyro and the associated tilt compensation actuation accomplished with a high frequency, high power servo (i.e. 550 Hz 760 usec center pulse width at 6 or 7.2 v)

The monitor 324 on the top end of the reference post 320 and the battery 326 on the bottom end can be counter extendable/retractable to add stability or reduce the overall cross section of the positioner respectively, whichever is more desired for a given shot or a given shooting environment.

This configuration allows for roll momentum decoupling between the device and the camera, converting unwanted support induced angular impulse about roll into translational displacement in the vertical direction. It also allows for the active servo stabilization in the tilt degree of freedom. Tilt stabilization should only be required through a relatively narrow range of motion since the overall size of the device and supported payload combined will afford significant moment of inertia about the pitch or tilt axis. This tilt stabilization may be accomplished with good power and frequency response, assuming a rate gyro driving a position servo is a good enough first approximation. If not, then a rate gyro commanding a continuous rotation servo is another option. Adequate response or lack thereof should be determined with a representative payload to assure sufficient stabilization performance about the tilt axis.

The camera workstation embodiment presents many advantages. The reference post can be extendable as a monopod. The right hand grip can be moved either along the right hand grip extension tube, or with that tube in and out of the cross bar to place the grip line across the system center of mass to minimize the required support torque and associated fatigue rate of the operator. The reference post can have a side handle adjacent its gimbal as well as upper and lower handles for added grip options.

The right hand grip can rotate with or without the right hand grip extension tube for top side, outboard or low side right hand hold. The embodiment allows single axis passive roll stabilization and one axis active tilt stabilization, body pointing in pan, with pan stability derived from displacement between grips and inertia of the operator's arms. No operator control is required during normal operation, just a gain control setting on the tilt gyro for whatever the operational environment or shooting requirement. This embodiment eliminates bulky electronics or related expense, complexity or mass associated with more complicated control system designs.

An extension for shoulder mount 342 could be telescopically extendable and stowed within the grip extension tube on the right hand side, or be removably attached to that tube or to either end of the cross bar 318.

Looking at commercially available thin section bearings shows the first two common sized bores for larger industrial series thin section are 1.0 inches and 1.5 inches inside diameter and those sizes typically start at width 3/16 inches. 1.0 and 1.5 inch bore diameters are also available in thin wall titanium alloy seamless tubing, an ideal material for the extension portions of the structure due to its light weight, high stiffness, durability, thermal stability, corrosion resistance, and other properties. Common sized tube fittings for mounting timing pulleys and other hardware onto these size extension tubes are available from Servo City, 3850 East 12th Avenue Winfield, Kans. 67156.

With the reference post 320 mounted outboard of the monitor side grip extension it may be rotated 360 degrees within the vertical plane, giving some important advantages. The reference post 320 may be used with the monitor either up or down, and on either the right side or the left, as well as either perpendicular or parallel to the monitor side grip extension and the optic axis.

Full range of reference post orientation would depend on the ability of the reference post 320 to be moved parallel to its monitor side grip extension and passed between that grip extension and the camera. Such passage of the reference post 320 between its extension and the camera would be facilitated by extendability of either the crossbar 318, or of the reference post 320 at one or both ends. Inverting the reference post 320 also has the very desirable effect of effectively switching the device from right handed to left handed and visa-versa.

If the center section of the reference post was a 2 inch by 4 inch carbon fiber tube of rectangular cross section, reference post extensions could be friction fit sections of 1 inch by 2 inch cross section pieces of the same carbon fiber tube family, from Allred and Associates Inc., of 321 Route 5 West, Elbridge, N.Y. 13060. The Allred precured braided structural composite tubing product is ideal for the camera positioner application due to its light weight, extreme stiffness, excellent thermal stability, ease of machinability, resistance to corrosion, durability, matte black color finish and other properties.

Multiple grips on the reference post side would also allow for hand hold gripping in multiple locations to give the operator more balance options.

To summarize, the basic concepts of length, inertial and body pointing are combined into a configuration that couples the spatial roll angle of the camera platter (tilt carriage) to that of a reference post supporting monitor and battery for added rotational inertia about pitch (tilt) and roll. By setting the reference post some displacement from the roll axis of the camera, said reference post-to-camera displacement may be used to absorb variable component of the support couple about the roll axis (i.e. unsteady support about roll, otherwise associated with undesirable unlevel or unsteady horizon within the image frame).

This 'roll absorber" feature can be accomplished passively using a commonly available timing pulley-and-belt mechanism with selective isolation of camera roll displacement relative to the crossbar roll angle, eliminating the need for active stabilization of that roll axis and the associated complexity, cost and weight of such active stabilization.

Further, the intuitive and adjustable grip arrangement allows for placement of the system center of mass substantially coincident with the grip line. This arrangement minimizes the support moment required of the operator, which lowers the fatigue rate associated with supporting the device during use.

The device is held substantially in front of the operator as with common and known hand held camera operating technique, allowing for simple intuitive body pointing through the pan or horizontal degree of freedom as is typical with such hand held camera application.

Sprockets and chain combination may be used interchangeably with timing pulleys and timing belt, respectively.

One possible combination of known materials and construction means is depicted for the roll fork and the camera platter that is pivotally attached said roll fork.

The foregoing description and details of embodiments are intended only as examples of possible camera positioning systems having features according to aspects of the invention. Further alternatives and variations will become apparent in view of this disclosure. The scope of the invention in its various forms and configurations should be determined by the following claims, rather than by the details of any given embodiments above.

I claim:

1. An operator supported camera positioning system, comprising:
    a camera platform assembly having a camera mount for mounting a camera, and at least one arm operatively connected to the camera mount for rotation of the camera mount about a first axis of rotation;
    a platform assembly support pivotally connected to the camera platform assembly for rotation of the camera mount about a second axis of rotation;
    an operator interface structure providing at least one engagement surface for operator support and control of the system, said operator interface structure operatively connecting to the platform assembly support;
    an inertial transducer operatively mounted on the system for sensing a rate of rotational motion of the transducer about one of the first axis of rotation and the second axis of rotation and generating a control signal responsive to the rate of rotational motion; and
    a drive operatively connected to the camera platform assembly for controlling rotation of the camera mount about the one axis in response to the control signal to substantially reduce deviation from an inertially fixed orientation of the camera mount about the one axis, wherein the engagement surface includes grip surfaces for the operator to hold and control motion of the system and wherein the operator interface structure includes an elongated beam, and wherein the length of the elongated beam between the grip surface closest to the camera mount and the camera mount positions the camera out of arm's reach when said grip surface is engaged, wherein the operator interface further includes a modular component providing a grip surface adjacent the platform assembly support and a removable beam component for coupling with the modular component and extending the operator interface structure.

2. The operator supported camera positioning system of claim 1, wherein the platform assembly support is pivotally connected to the operator interface structure for rotation of the camera mount about a third axis of rotation.

3. The operator supported camera positioning system of claim 1, wherein the platform assembly support is fixed to the operator interface structure.

4. The operator supported camera positioning system of claim 1, further comprising a second inertial transducer operatively mounted on the system for sensing a second rate of rotational motion of the transducer about the other of the first axis of rotation and the second axis of rotation and generating a control signal responsive to the second rate of rotational motion; and a second drive operatively connected to the camera platform assembly for controlling rotation of the camera mount about the other axis in response to the control signal to substantially reduce deviation from an inertially fixed orientation of the camera mount about the other axis.

5. The operator supported camera positioner system of claim 1, wherein the camera platform assembly is constructed of tubular components that are adjustably coupled with close tolerance fit connections.

6. The operator supported camera positioner system of claim 1, wherein the operator interface structure includes at least one operator control at a proximal end remote from the camera platform assembly, said at least one operator control sending signals wirelessly to the drive to control rotational movement of the camera mount about the one axis.

7. The operator supported camera positioner system of claim 1, wherein the operator interface structure includes a reference post pivotally mounted at a proximal end of the elongated beam component.

8. The operator supported camera positioner system of claim 1, wherein the inertial transducer has an adjustable gain that can be selectively set over a range of values from zero through some value greater than unity.

9. The operator supported camera positioning system of claim 1, wherein the camera mount provides a surface for selectively mounting different types of cameras.

10. The operator supported camera positioner system of claim 5, wherein the camera platform assembly can be balanced for changes in camera loading to move the center of gravity by adjusting the relative positions of the tubular components.

11. An operator supported camera positioning system, comprising:
a camera platform assembly having a camera mount for mounting a camera, and at least one arm operatively connected to the camera mount for rotation of the camera mount about a first axis of rotation;
a platform assembly support pivotally connected to the camera platform assembly for rotation of the camera mount about a second axis of rotation;
an operator interface structure providing at least one engagement surface for operator support and control of the system, said operator interface structure operatively connecting to the platform assembly support;
an inertial transducer operatively mounted on the system for sensing a rate of rotational motion of the transducer about one of the first axis of rotation and the second axis of rotation and generating a control signal responsive to the rate of rotational motion, said inertial transducer having an adjustable gain that can be selectively set over a range of values from zero through some value greater than unity; and
a drive operatively connected to the camera platform assembly for controlling rotation of the camera mount about the one axis in response to the control signal to substantially reduce deviation from an inertially fixed orientation of the camera mount about the one axis, whereby the operator may set the gain to a value above unity and rotate the positioner through some angle containing a foreground photographic object, causing the camera pointing to overcorrect beyond inertially fixed pointing and subsequently effect automatic tracking of said foreground object within the viewable scene of the camera.

12. An operator supported camera positioning system, comprising:
a camera platform assembly having a camera mount for mounting a camera, and at least one arm operatively connected to the camera mount for rotation of the camera mount about a first axis of rotation;
a platform assembly support pivotally connected to the camera platform assembly for rotation of the camera mount about a second axis of rotation;
an operator interface structure providing at least one engagement surface for complete, unassisted operator support and motion control of the system, said operator interface structure operatively connecting to the platform assembly support;
an inertial transducer operatively mounted on the system for sensing a rate of rotational motion of the transducer about one of the first axis of rotation and the second axis of rotation and generating a control signal responsive to the rate of rotational motion; and
a drive operatively connected to the camera platform assembly for controlling rotation of the camera mount about the one axis in response to the control signal to substantially reduce deviation from an inertially fixed orientation of the camera mount about the one axis, wherein the engagement surface includes grip surfaces for the operator to hold
and control motion of the system and wherein the operator interface structure includes an elongated beam, wherein the elongated beam includes a distal beam extending from the camera platform assembly support and a proximal beam and a series of adjustable parallel offset members interconnecting the distal beam and the proximal beam and maintaining them in a spaced apart and substantially parallel orientation whereby the position of the proximal beam can be set relative to the camera platform assembly so that a center of mass of the camera platform assembly when equipped with a camera can coincide with a longitudinal axis of the proximal beam to reduce the support forces required of the operator.

* * * * *